(12) United States Patent
Lee

(10) Patent No.: US 6,208,490 B1
(45) Date of Patent: Mar. 27, 2001

(54) MAGNETO-RESISTIVE HEAD UTILIZING PLURAL PLATES ARRANGED WITH THEIR EASY AXIS PARALLEL TO RECORDED MAGNETIC FLUX

(75) Inventor: Hae-jung Lee, Kumi (KR)

(73) Assignee: Samsung Electronics Co., Ltd,, Suwon (KR)

( * ) Notice: Subject to any disclaimer, the term of this patent is extended or adjusted under 35 U.S.C. 154(b) by 0 days.

(21) Appl. No.: 09/232,183

(22) Filed: Jan. 15, 1999

(30) Foreign Application Priority Data

Jan. 15, 1998 (KR) ................................................ 1998-1046

(51) Int. Cl.[7] ........................................................ G11B 5/39
(52) U.S. Cl. .................................................................. 360/313
(58) Field of Search ....................................... 360/113, 121

(56) References Cited

U.S. PATENT DOCUMENTS

| | | | |
|---|---|---|---|
| 4,622,615 | * 11/1986 | Desserre | 360/121 |
| 5,301,079 | * 4/1994 | Cain | 360/113 |
| 5,576,915 | * 11/1996 | Akiyama | 360/113 |
| 5,828,528 | 10/1998 | Tolman et al. | |
| 5,872,689 | * 2/1999 | Gill | 360/113 |

* cited by examiner

*Primary Examiner*—A. J. Heinz
(74) *Attorney, Agent, or Firm*—Robert E. Bushnell, Esq.

(57) ABSTRACT

A magneto-resistive (MR) head of a new structure provides a linear output according to the variation of a recording magnetic flux. The magneto-resistive head generates an electrical output corresponding to the variation of a recording magnetic flux recorded on a disk, and includes an MR element portion disposed in such a manner that the forward (easy) direction of the MR element portion parallels the direction of the recording magnetic flux, and conductors coupled to the MR element portion through which a measured current flows. The MR head has linear output characteristics with respect to the variation of the recording magnetic flux. Also, the MR head does not need a bias means as does the conventional MR head.

10 Claims, 3 Drawing Sheets

MAGNETO-RESISTIVE HEAD UTILIZING PLURAL PLATES ARRANGED WITH THEIR EASY AXIS PARALLEL TO RECORDED MAGNETIC FLUX

CLAIM OF PRIORITY

This application makes reference to, incorporates the same herein, and claims all benefits accruing under 35 U.S.C §119 from an application entitled *Non-Deflection Magneto-Resistive Head* earlier filed in the Korean Industrial Property Office on Jan. 15, 1998, and there duly assigned Ser. No. 98-1046 by that Office.

BACKGROUND OF THE INVENTION

1. Field of the Invention

The present invention relates to a magneto-resistive head, and more particularly, to a magneto-resistive head of a new structure which provides a linear output according to variation of a recording magnetic flux.

2. Description of the Related Art

An existing inductive head adopts a method for converting a variation of a magnetic flux on a disk into a variation of a voltage in a head coil, using a head core wound with a coil. In this inductive head, if the frequency of a data signal becomes high, the inductance of the head coil should be lowered to maintain stability of the data signal. This causes an induced voltage of the head to be lowered, and finally detection of the data signal to be unstable.

A magneto-resistive head (hereinafter, referred to as MR head) is provided for solving the above problem. The MR head has an MR sensor for easily detecting variations of a magnetic flux when the data signal has a high frequency. The MR head converts variations in magnetic flux into variations in resistance, using the MR sensor, when a data read is performed, but records data with an existing inductive head when a data write is performed, to enable a signal-to-noise ratio to be improved.

FIG. 1 shows the structure of a conventional general MR head. See U.S. Pat. No. 5,828,528 to Charles H. Tolman et al. entitled *MR Sensors With Selected Resistances For The Sensing And Biasing Layers To Enhance Reading Capabilities,* incorporated herein by reference. In FIG. 1, an MR element 10 is isolated from a soft adjacent layer (SAL) 12 by a spacer 14. The MR element 10 is disposed in such a manner that the forward (easy) direction of the MR element 10 parallels the direction of width of a track.

A bias magnetic flux Hb is applied via the SAL 12, in order to avoid non-linearity when the easy direction of the MR head 10 is horizontal. The bias magnetic flux Hb forms a predetermined angle with respect to the easy direction magnetic flux He. This angle can be adjusted by adjusting the thickness and constituent ratio of the SAL 12.

The resistance of the MR element 10 is modulated by the flux of data recorded on a medium. Here, the easy direction of the MR element 10 means a direction of varying the resistance of the MR element 10 with respect to variations of the magnetic flux.

When a measured current flowing through the MR element 10 is I, the output voltage of the MR element 10 equals a value obtained by multiplying the varied resistance by the measured current according to Ohm's law.

That is, $\Delta V = I\Delta R$.

FIG. 2 is a graph showing the resistance characteristics in the FIG. 1 apparatus. In FIG. 2, the X axis denotes the easy direction magnetic flux He, and the Y axis denotes the recording magnetic flux Hy. The recording magnetic flux Hy moves to the upper or lower direction assuming the magnitude is the same.

A vector angle of a composite magnetic flux formed by composition of the recording magnetic flux Hy and the bias magnetic flux Hb varies as the direction of the recording magnetic flux Hy varies.

In this case, the resistance of the MR element is determined as follows.

$$\rho = \rho_0 + \Delta\rho\cos^2\theta \tag{1}$$

in which $\rho$ denotes a specific resistance of the MR element 10, $\Delta\rho$ denotes a maximum value of variation of the specific resistance, and $\theta$ denotes an angle between the easy direction magnetic flux He and the composite magnetic flux.

The maximum value of the resistance variation is generated when $\theta$ equals 0° and the minimum value is generated when $\theta$ equals 90°. The resistance variation according to the direction of the recording magnetic flux is symmetrical when $\theta$ equals 45°. Thus, if the bias magnetic flux Hb forms an angle of 45° with respect to the easy direction magnetic flux He, a substantially linear resistance characteristic is obtained with respect to the variation of the recording magnetic flux.

In FIG. 2, when the directions of the composite magnetic fluxes with respect to the recording magnetic fluxes Hy and −Hy are $\theta'$ and $\theta'''$, the specific resistance varies to $\rho'$ and $\rho'''$, respectively. Also, $\theta'$ and $\theta''$ are symmetrical with respect to an angle of 45°, $(\rho'-\rho\rho'')$ and $(\rho''-\rho''')$ are approximately equal.

However, as can be seen from the equation (1), the variation of the output signal according to the recording magnetic flux Hy is not fundamentaly linear, which causes a problem of asymmetry. That is, in FIG. 2, $(\rho'-\rho'')$ and $(\rho''-\rho''')$ are not substantially equal. asymmetry problem causes a processor to generate an error when a signal recorded on a disk is read out from an output of the MR element 10.

SUMMARY OF THE INVENTION

To solve the above problem(s), it is an objective of the present invention to provide an improved magneto-resistive head in which the variation of an output signal according to a recording magnetic flux Hy is linear.

Accordingly, to achieve the above objective, there is provided a magneto-resistive head which generates an electrical output corresponding to a variation of a recording magnetic flux recorded on a disk, the magneto-resistive (MR) head comprising: an MR element portion disposed in such a manner that the forward (easy) direction of the MR element portion parallels the direction of the recording magnetic flux; and conductors coupled to the MR element portion through which a measured current flows.

BRIEF DESCRIPTION OF THE DRAWING(S)

A more complete appreciation of the present invention, and many of the attendant advantages thereof, will become readily apparent as the same becomes better understood by reference to the following detailed description when considered in conjunction with the accompanying drawings in which like reference symbols indicate the same or similar components, wherein.

DESCRIPTION OF THE PREFERRED EMBODIMENT(S)

A preferred embodiment of the present invention will be described with reference to the accompanying drawings.

Figure 3:
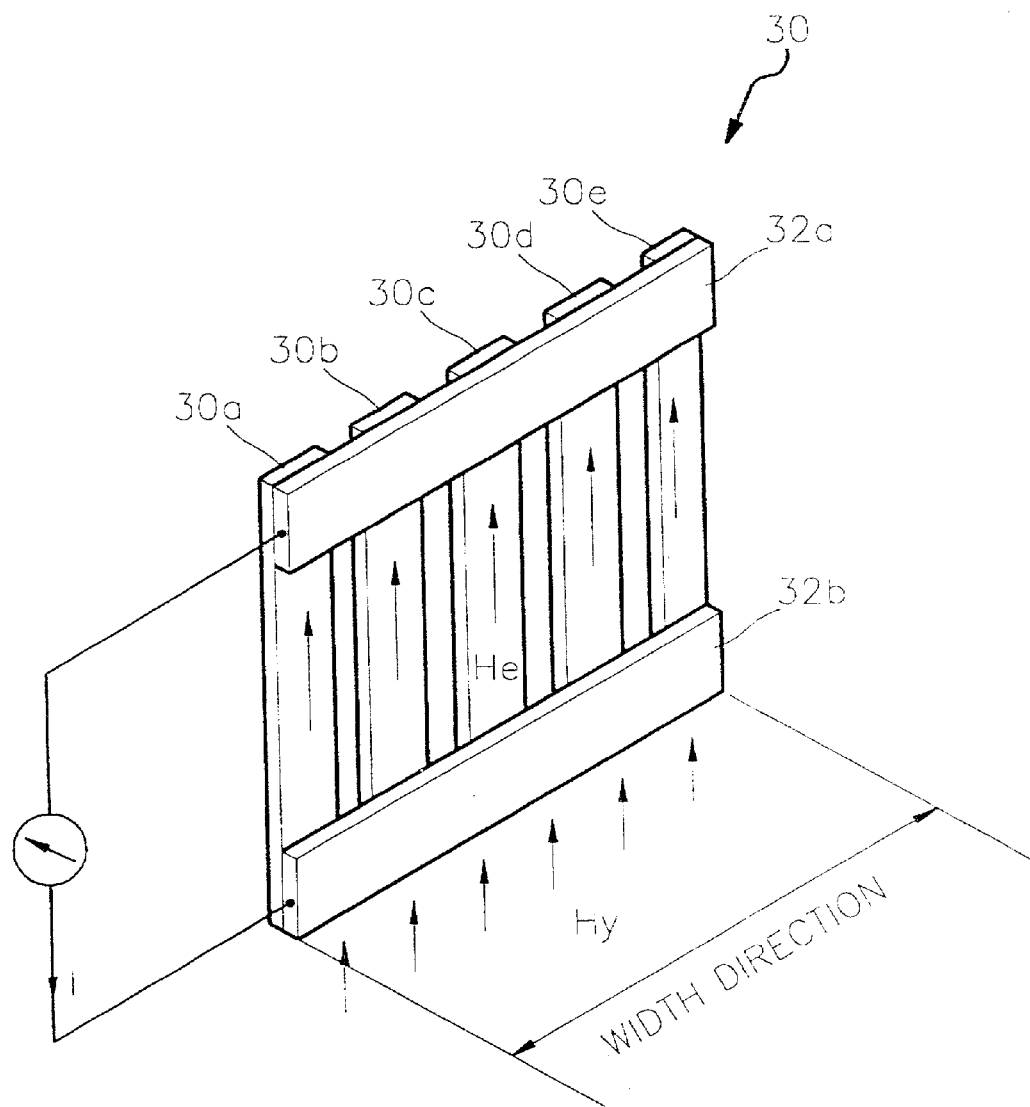
FIG. 3 shows the structure of a non-deflection magneto-resistive head according to the present invention.

In FIG. 3, an MR element portion 30 is disposed in such a manner that the forward (easy) direction of the MR element portion 30 parallels the direction of the recording magnetic flux. The MR element portion 30 is comprised of a plurality of plates 30a through 30e. The plurality of plates 30a through 30e are electrically connected to the conductors 32a and 32b through which a measured current I flows.

In the FIG. 3 apparatus, since a recording magnetic flux Hy coming from a disk has the same magnetic flux direction as the forward magnetic flux He through plates 30a–30e of the MR element portion 30, a linear output having a directional property is output from the MR element portion 30.

The variation of resistance of the MR element portion 30 according to recording magnetic flux is as follows.

$$\rho = \rho_0 + AHy \qquad (2)$$

in which A is a constant.

Figure 1:
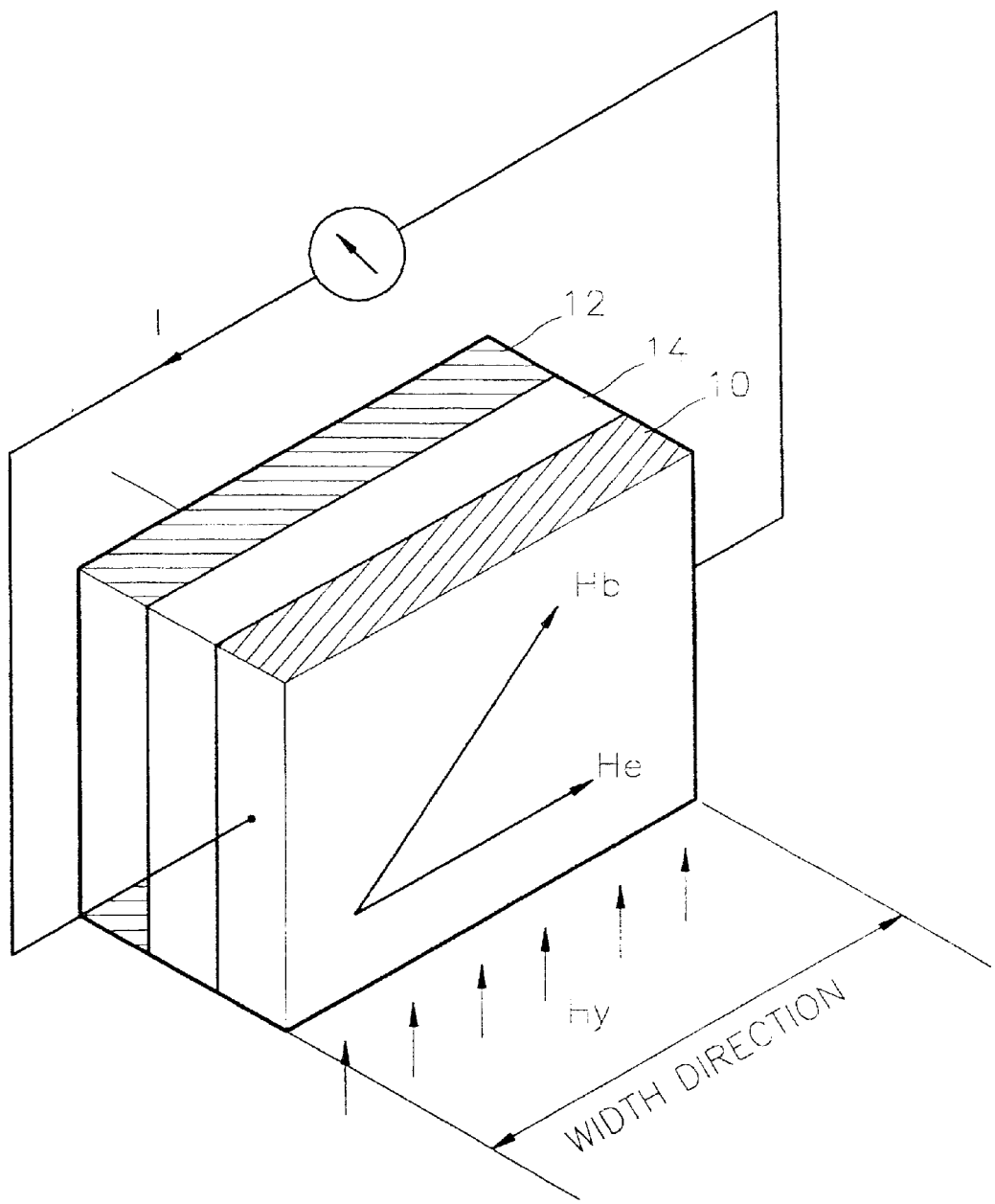
FIG. 1 shows the structure of a conventional general MR head.
Figure 2:
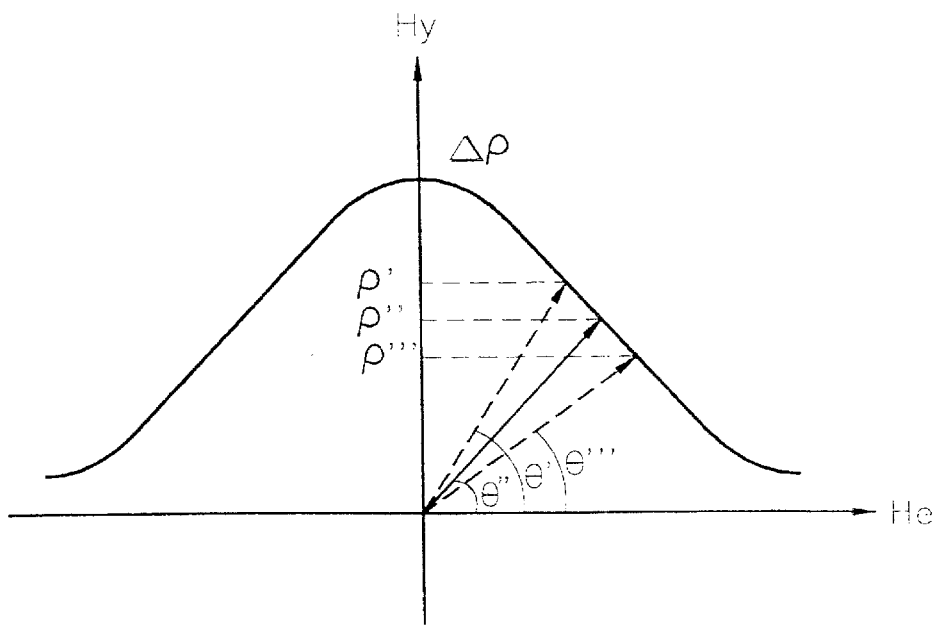
FIG. 2 is a graph showing the resistance characteristics of the magneto-resistive head shown in the FIG. 1 apparatus.
Figure 4:
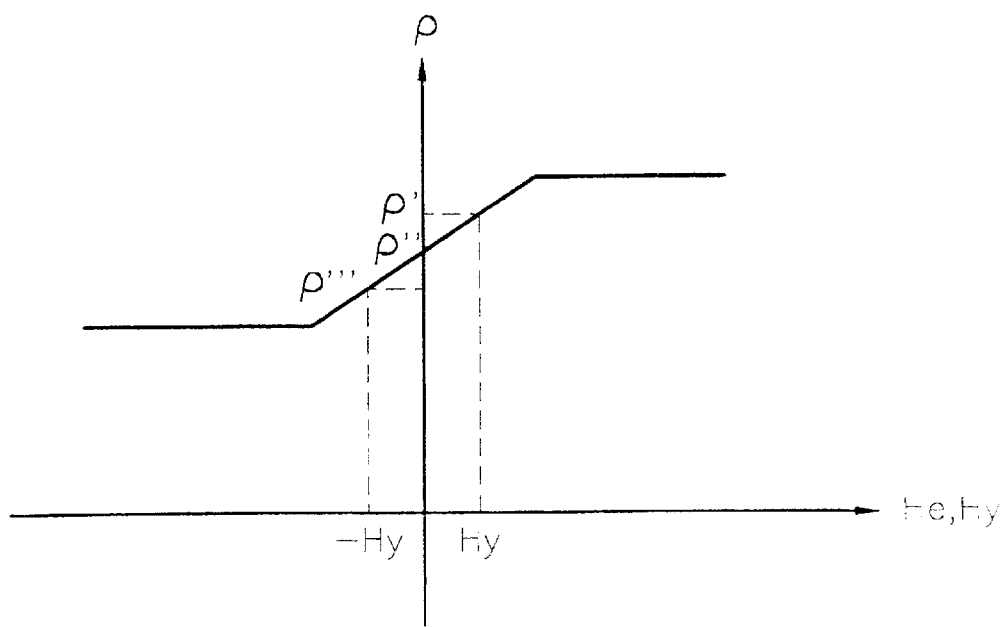
FIG. 4 is a graph showing the resistance characteristics of the magneto-resistive head shown in the FIG. 3 apparatus.

FIG. 4 is a graph showing the resistance characteristics of the MR head shown in the FIG. 3 apparatus. In FIG. 4, the X axis denotes the direction of Hy and He and the Y axis denotes the resistance p. As shown in FIG. 4, the MR head according to the present invention shows a linear characteristic around $\rho_0$.

That is, $(\rho'-\rho'')$ and $(\rho''-\rho''')$ are substantially equal with respect to Hy and –Hy, and the resistance characteristics are linear.

Thus, the present invention does not require biasing using a SAL as in the conventional art, and has the benefit of a linear output.

Here, the MR element portion 30 is comprised of a plurality of parallel plates 30a through 30e. This prevents a phenomenon where the characteristics include a non-linear component due to distortion of the magnetic flux when the MR element portion 30 is comprised of a single plate. That is, since the MR element portion 30 is comprised of a plurality of plates using a phenomenon that a magnetic flux between adjacent plates is uniformly distributed, a recording magnetic flux passing through the MR element portion 30 is uniformly distributed. Accordingly, the resistance varies linearly according to the recording magnetic flux, in the MR element portion 30.

As described above, the MR head according to the present invention has a linear output with respect to variations of the recording magnetic flux. Also, the MR head according to the present invention does not need a bias means as does the conventional MR head.

What is claimed is:

1. A magneto-resistive head which generates an electrical output corresponding to the variation of a recording magnetic flux recorded on a disk, the magneto-resistive head comprising:

a magneto-resistive element portion disposed in such a manner that a forward (easy) direction of said magneto-resistive element portion parallels a direction of the recording magnetic flux said magneto-resistive element portion including of a plurality of plates spaced apart from each other in a single plane; and a conductor portion coupled to each of said plates of the magneto-resistive element portion, through which a measured current flows.

2. The magneto-resistive head according to claim 1, said conductor portion comprising:

a first conductor and a second conductor disposed orthogonally to the direction of the recording magnetic flux and across a width of a track, wherein a measured current flows through said first and second conductors.

3. The magneto-resistive head according to claim 1, wherein said plurality of plates are spaced by a uniform distance.

4. The magneto-resistive head according to claim 1, wherein said conductor portion comprises:

a first conductor disposed to extend adjacent to and across a width of a track said first conductor being coupled to a first end of each of said plates;

a second conductor connected to said first conductor and spaced vertically apart from said first conductor by said magneto-resistive element portion, said second conductor being coupled to a second end of each of said plates, wherein a measured current flows through said first and second conductors.

5. The magneto-resistive head according to claim 1, wherein said conductor portion comprises:

a first conductor disposed to extend adjacent to and across a width of a track, said first conductor being coupled to a first end of each of said plates;

a second conductor connected to said first conductor and spaced parallel to and vertically apart from said first conductor by said plurality of plates, said second conductor being coupled to a second end of each of said plates, wherein a measured current flows through said first and second conductors.

6. The magneto-resistive head according to claim 5, wherein of said plurality of plates are parallel and spaced apart by a uniform distance.

7. A magneto-resistive head which generates an electrical output corresponding to the variation of a recording magnetic flux recorded on a disk, the magneto-resistive head comprising:

a first conductor disposed to extend adjacent to and across a width of a track;

a second conductor connected to said first conductor and spaced parallel to vertically apart from said first conductor, wherein a measured current flows through said first and second conductors; and a magneto-resistive element portion coupled to said first and second conductors, said magneto-resistive element portion including a plurality a parallel uniformly spaced plates, each of said plates having a first end portion orthogonally and directly connected to said first conductor and a second end portion orthogonally and directly connected to said second conductor, wherein an easy direction of said plurality of parallel uniformly spaced plates parallels a direction of said recording magnetic flux.

8. A magneto-resistive head which generates an electrical output corresponding to the variation of a recording magnetic flux recorded on a disk, the magneto-resistive head comprising:

a first conductor disposed to extend adjacent to and across a width of a track;

a second conductor connected to said first conductor and spaced vertically apart from and parallel to said first conductor, wherein a measured current flows through said first and second conductors; and a plurality a parallel uniformly spaced plates, each of said plates having a first end portion orthogonally connected to said first conductor and a second end portion orthogonally connected to said second conductor, wherein an easy direction of said plurality of parallel uniformly spaced plates parallels a direction of said recording magnetic flux.

9. The magneto-resistive head as set forth in claim 8, wherein said plurality a parallel uniformly spaced plates have uniformly distributed magnetic flux between adjacent plates.

10. A method of providing a linear output with respect to variations of a recording magnetic flux, said method comprising:

passing a measured current through a conductor adjacent a track comprising said recording magnetic flux; and generating an easy direction magnetic flux parallel to a direction of said recording magnetic flux by a plurality of uniformly spaced parallel plates electrically connected to said conductor, said plates having uniformly distributed magnetic flux between adjacent plates.

* * * * *